April 2, 1940.    E. A. ROCKWELL    2,195,498
VARIABLE SPEED TRANSMISSION
Filed Sept. 11, 1937    2 Sheets-Sheet 2
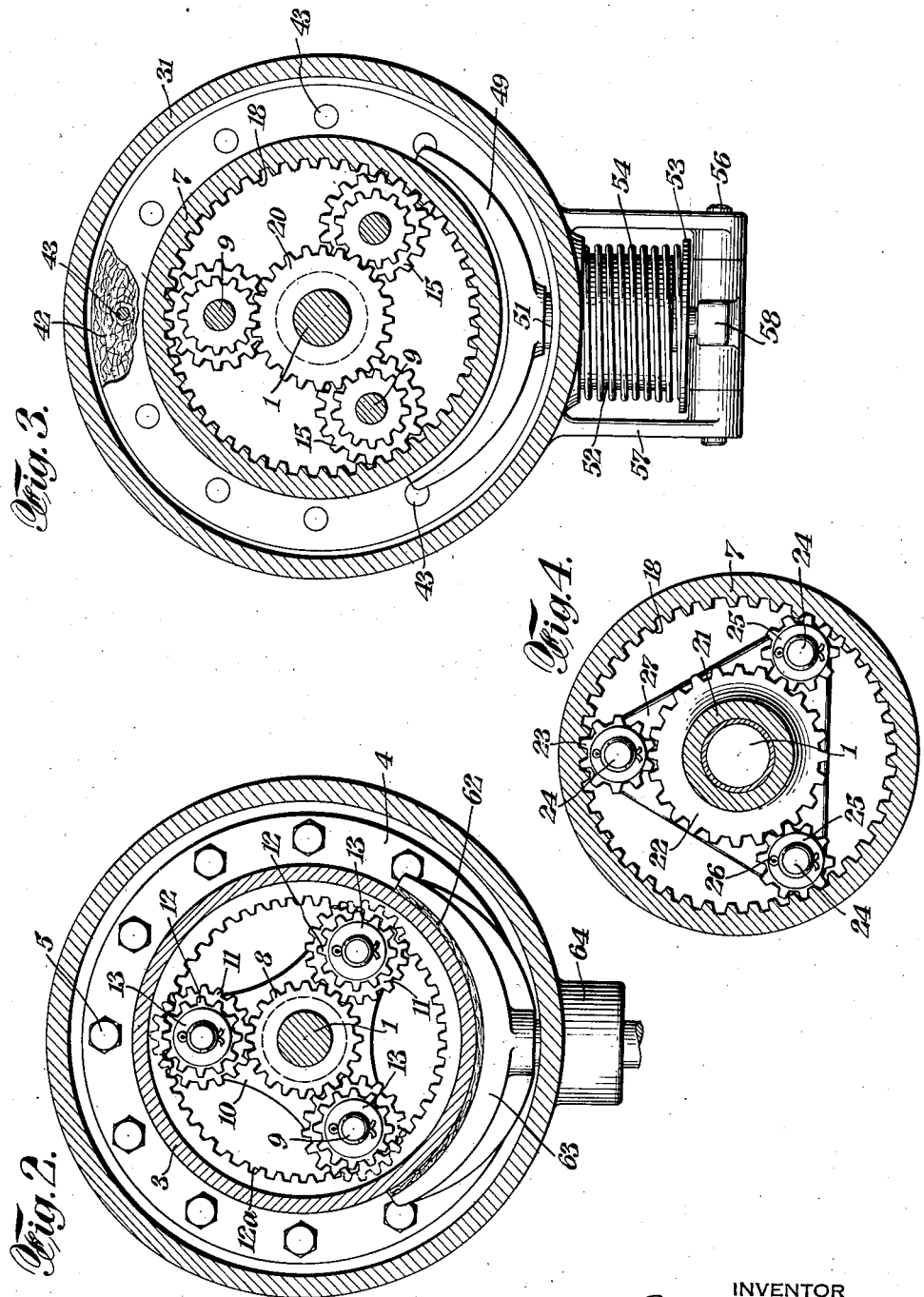
INVENTOR
Edward A. Rockwell
BY
Arthur Wright
ATTORNEY Patented Apr. 2, 1940

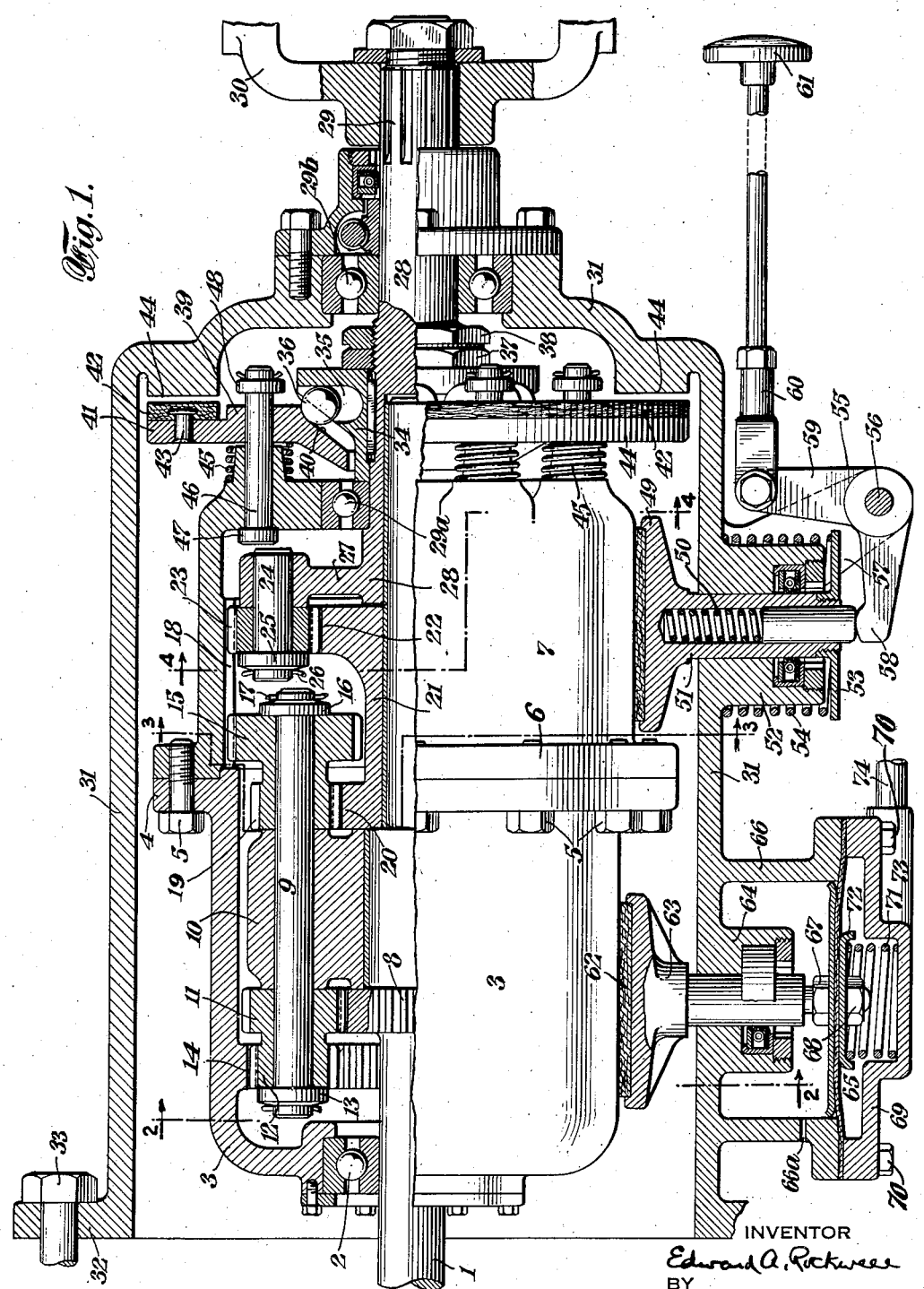

2,195,498

UNITED STATES PATENT OFFICE 2,195,498

VARIABLE SPEED TRANSMISSION

Edward A. Rockwell, West Hartford, Conn.

Application September 11, 1937, Serial No. 163,334

21 Claims. (Cl. 74—260)

My invention relates particularly to an apparatus which may be adapted to act as a torque converter or to convey variable speeds, or both, for any desired purpose and for any desired type of power installation, but it has special application to controlling the relative speeds between the driving and driven portions of an automobile.

The object of my invention is to provide an apparatus by means of which a wide range of speed ratios may be attained. A further object is to provide an apparatus of this character in which the speed ratio may be changed automatically, according to the speed of the driven part of the construction. Another object is to provide means whereby the speed ratio may be changed manually, as desired, and through all the different speed ratios within any given range of relative speeds. Still another object is to provide an apparatus of this character in which, especially on automobiles, the speed ratio changes according to the load, as, for example, the vacuum produced in the operation of the automobile engine. Further objects of my invention will appear from the detailed description of the same hereinafter.

While my invention is capable of being carried out in many different ways, for the purpose of illustration I have shown only one embodiment of my invention in the accompanying drawings, in which—

Fig. 1 is a plan view of my invention partly in section;

Fig. 2 is a transverse vertical section thereof taken on line 2—2 of Fig. 1;

Fig. 3 is a cross-section of Fig. 1 on line 3—3; and

Fig. 4 is a cross-section of Fig. 1 or line 4—4.

In the drawings, I have shown a driving shaft 1 which may be the driving shaft of an automobile and which may have thereon the usual connection to any known forward, neutral, and reverse driving transmission (not shown) and in front thereof an automobile clutch connecting it to the engine shaft of an internal combustion engine, by way of example. The shaft 1 passes through forward ballbearings 2 carried in a forward rotary casing 3 having a flange 4 thereon connected by screws 5 to a flange 6 on a rear rotary casing 7. The driving shaft 1 has thereon a gear 8 which is adjacent to a sleeve 10 adapted to rotate freely on the shaft 1. On the forward end of a floating shaft 9 there is a gear 11 meshing with the gear 8, the said gear 11 having integral therewith a reduction gear 12 adjacent to a head 13 on the forward end of the shaft 9. The said gear 12 in turn meshes with an internal gear 14 on the interior of the forward rotary casing 3. On the rear end of the shaft 9 there is a large gear 15 held in place by a washer 16 and a cotter-pin 17 on the rear end of the shaft 9. The said gear 15 meshes with an internal gear 18 on the rear rotary casing 7. Furthermore, the said gear 15 has integral therewith a reduction gear 19 which meshes with a gear 20 on an intermediate driven sleeve shaft 21 located around the shaft 1. The rear end of the sleeve shaft 21 is provided with a gear 22 which meshes with a gear 23 which is also meshed with the internal gear 18 on the rear rotary casing 7. This gear 23 is carried by a stud shaft 24 on which it is rotatably held by a washer 25 and a cotter-pin 26. The said stud shaft 24 is carried by an arm 27 on the forward recessed end of a driven shaft 28, the rear end of which has splines 29 for connecting it to the usual universal joint 30 leading to the usual transmission shaft for driving the rear automotive axle of an automobile in the usual way. It will be noted that the rear end of the driving shaft 1 is rotatably supported within the forward recess within the driven shaft 28 and that the forward portion of the driven shaft 28 is supported in ballbearings 29a located in the rear rotary casing 7. Also, the rear portion of the driven shaft 28 is supported within ballbearings 29b carried in a housing 31 which may have a front flange 32 for attaching the same, by means of screws 33, to the automobile transmission housing or any other convenient part of the automobile structure. This housing 31 may or may not form a complete closure with the transmission housing or any other part of the automobile to receive within the same a body of oil for effective lubrication of the entire apparatus. At substantially the middle portion of the shaft 28, keyed thereto, and adjacent to the ballbearings 29a there is a sleeve 34 having in the periphery thereof a plurality of substantially spherical pockets 35, in each of which there is located a centrifugal ball 36. The sleeve 34 is held in place by nuts 37 and 38 screwthreaded on the shaft 28. The said centrifugal balls 36 are adapted to be thrown outwardly by centrifugal force, according to the speed of the driven shaft 28, so that when they are moved outwardly away from the axis of the shaft 28 they bring about the lateral movement of an annular cam member 39 having a cam surface 40 for cooperating with the centrifugal balls 36. The cam member 39 has a peripheral flange 41, to the rear face of which there is secured a fabric brake facing 42 which is secured to the flange by rivets 43. The brake facing is designed for cooperation with a brake facing 44 located on the stationary housing 31, and is designed to be normally engaged therewith by reason of a spring 45 located on pins 46 extending rearwardly through the rear rotary casing 7, the said pins 46 having heads 47 at the front ends thereof and sleeves with cotter-pins 48 at the rear ends thereof. Furthermore, the said rear rotary casing 7 has a shoe 49 adapted to bear against the outside thereof, the force of which is modulated by a small spring 50 in the interior of a stem 51 thereon which is adapted to be moved within a flanged opening 52 in the housing 31. The outer end of the stem 51 has a sleeve 53 to provide a support for a retracting spring 54 on the outside of the flange 52, which normally retracts the shoe 49 out of contact with the rear rotary casing 7. A bell-crank lever 55 carried by a pivot 56 on a bracket 57 extending from the side of the housing 31, has one arm 58 bearing upon the end of the stem 51 and another arm 59 connected by a wire or rod 60 in any desired way to a push-and-pull thumb-piece 61 which may be located at any desired point on the automobile, as, for example, on the dash thereof within reach of the driver. By means of the shoe 49 a manual change of the speed ratio can be attained at will by the driver.

Furthermore, bearing upon the forward rotary casing 3 there is a shoe 62 carried by a stem 63 adapted to move within a flanged opening 64 in the housing 31. The stem 63 is carried by a diaphragm 65 mounted on a diaphragm housing flange 66 vented at 66a forming a part of the housing 31, said stem 63 having at its end nuts 67 and 68 securing it to the diaphragm. The diaphragm 65 is secured in place by an outside housing member 69 and screws 70 passing into the inner diaphragm housing member 66, and within the outer housing member 69 there is a spring 71 which is supported at its inner end within a cup-shaped member 72 secured between the nuts 67 and 68 so as to normally press the shoe 62 into contact with the outside of the forward rotary casing 3. The outer diaphragm housing 69, furthermore, has an opening 73 which is connected by a pipe 74 leading to any fluid pressure or vacuum control, as, for example, to the manifold of the said internal combustion engine of an automobile. By means of the shoe 62 it will be understood that the ordinary vacuum of the internal combustion engine will retract the shoe 62 out of contact with the forward rotary casing 3 but that when a heavy load is applied in the operation of the automobile, the very low vacuum resulting will not be sufficient to counteract the force of the spring 71 so that, as a result, the shoe 62 will engage the outside of the forward rotary casing 3.

In the operation of my invention, it will be assumed that the driving shaft 1 is being operated in a clockwise direction, as shown in Fig. 1 facing towards the right in said figure, by the transmission being thrown into forward speed by a hand-lever in the usual way and the clutch being let into engagement by a foot-lever in the usual way when the automobile is about to be driven. In this position of the apparatus, in the initial operation of the automobile, with the engine idling, the fabric brake surface 42 will be in engagement with the brake surface 44 on the housing 31, the shoes 49 and 62 being out of engagement with the rotary casing 3, 7, which acts as a reaction member for the gear train. Consequently, in this position of the parts the said casing will be at rest as it is stationary with regard to the housing 31. With the casing thus held at rest the gear train between the driving shaft 1 and the driven shaft 28 will drive the latter at a low speed with regard to the driving shaft, and which may be any desired ratio according to the sizes of the gears thereof, but which may, for example, be, if desired, a gear ratio of 1 to 5. As the automobile acquires speed the centrifugal balls 36 will be thrown outwardly until the brake surface 42 is at first partially and then completely released from contact from the brake surface 44, thereby freeing the casing 3, 7 from the housing 31. As a result the speed ratio of 1 to 5 will gradually change until a 1 to 1 ratio is attained. This will be evident from the fact that when the casing 3, 7 is thus released it will rotate in unison with the shafts 1 and 29, which will thus be effectively locked together in the high speed drive of the automobile. This occurs by reason of the fact that the force of the driving shaft 1 moving in a clockwise direction will tend to rotate the casing 3, 7 anti-clockwise and likewise the floating shaft 9 will tend to be rotated bodily, as a whole, clockwise as compared with the tendency of the casing 3 to rotate anti-clockwise, and by reason of the fact, also, that at the same time the load on the driven shaft 28, and consequently on the intermediate driven shaft 21, will tend, through the gears 15 and 19, to rotate the rotary casing 3, 7 clockwise and consequently the floating shaft 9 anti-clockwise. In other words, the two ends of the shaft 9 tend to be rotated in opposite directions and, consequently, the casing 3, 7, and the shafts 1 and 28, will rotate in unison as a result. In the operation of the automobile, if it is desired, however, to choose or select a driven speed ratio, this can be done by bringing the shoe 49 into contact with the casing 3, 7 by moving the button 61 on the dash of the automobile to any extent desired. This will be brought about by the retarding more or less of the movement of the casing 3, 7, the force necessary to bring about this retardation being, however, very small indeed by reason of the near or complete balancing of the forces tending to rotate the casing 3, 7 in opposite directions, as above pointed out, this balancing or near balancing being aided also by the presence of the gear 23 which tends to rotate the casing 3, 7 in the same direction as the tendency thereof produced by the gear 15 under the influence of the load on the shaft 28. Furthermore, in the operation of the automobile, a similar control, but automatic, of the speed ratio is attained by the shoe 62. This will be evident from the fact that when the load on the automobile is heavy the vacuum in the manifold is, accordingly, low and the low vacuum is then no longer adequate to counteract the force of the spring 71 so that the shoe then contacts with and slows down the movement of the casing 3, 7.

In this way changed speed ratios for other power installations are readily attained. This changed speed is automatically accomplished according to the speed of the driven shaft, and is automatically accomplished according to the load on the driven shaft. In addition thereto the speed ratio can be changed at will manually. Furthermore, the entire apparatus not only requires very small effort automatically as well as manually to control the same, but is very compact as it occupies only a small space and the parts, accordingly, are inexpensive to manufacture.

While I have described my invention above in detail I wish it to be understood that many changes may be made therein without departing from the spirit of the same. For instance, the speed of rotation of the reaction member may be controlled or brought about in any desired way and by means of manifold different types of devices within the spirit of my invention.

I claim:

1. A speed ratio changing apparatus comprising a driving shaft, a driven shaft and a power transmitting train, adapted to produce a relative change of speeds, located between the driving and driven shafts, having a reaction member coupled to the elements of the train and adapted to be restrained, the elements of said train being adapted to urge the reaction member in opposite directions simultaneously and to drive the driven shaft at an increasing velocity for a given speed of the driving shaft in accordance with the lessening of the restraint on the reaction member.

2. A speed ratio changing apparatus comprising a driving shaft, a driven shaft and a power transmitting train mounted on a floating shaft, adapted to produce a relative change of speeds, located between the driving and driven shafts, having a reaction member coupled to the elements of the train and adapted to be restrained, the elements of said train being adapted to urge the reaction member in opposite directions and to drive the driven shaft at an increasing velocity for a given speed of the driving shaft in accordance with the lessening of the restraint on the reaction member and thus urge, likewise, the two ends of the floating shaft in opposite directions.

3. A speed ratio changing apparatus comprising a driving shaft, a driven shaft, a gear train, adapted to produce a relative change of speeds, located between the driving and driven shafts, having a reaction member coupled to the gears of the train and adapted to be restrained, the gears of said train being adapted to urge the reaction member in opposite directions simultaneously and to drive the driven shaft at an increasing velocity for a given speed of the driving shaft in accordance with the lessening of the restraint on the reaction member, and means to retard the rotation of the reaction member.

4. A speed ratio changing apparatus comprising a driving shaft, a driven shaft, means to produce a relative change of speeds containing a gear train part of which is mounted on a floating shaft, located between the driving and driven shafts, having a freely rotatable reaction member coupled between the gears of the train, the gears of said train being adapted to urge the reaction member in opposite directions and thus urge, likewise, the two ends of the floating shaft in opposite directions, and means to retard the rotation of the reaction member.

5. A speed ration changing apparatus comprising a driving shaft, a driven shaft, a gear train, adapted to produce a relative change of speeds, located between the driving and driven shafts, having a reaction member coupled to the gears of the train and adapted to be restrained, the gears of said train being adapted to urge the reaction member in opposite directions and to drive the driven shaft at an increasing velocity for a given speed of the driving shaft in accordance with the lessening of the restraint on the reaction member, and a centrifugal releasable brake to retard the rotation of the reaction member.

6. A speed ratio changing apparatus comprising a driving shaft, a driven shaft, means to produce a relative change of speeds containing a gear train part of which is mounted on a floating shaft, located between the driving and driven shafts, having a reaction member coupled between the gears of the train, the gears of said train being adapted to urge the reaction member in opposite directions and thus urge, likewise, the two ends of the floating shaft in opposite directions, and a centrifugal releasable brake to retard the rotation of the reaction member.

7. A speed ratio changing apparatus comprising a driving shaft, a driven shaft, a gear train, adapted to produce a relative change of speeds, located between the driving and driven shafts, having a reaction member coupled to the gears of the train and adapted to be restrained, the gears of said train being adapted to urge the reaction member in opposite directions and to drive the driven shaft at an increasing velocity for a given speed of the driving shaft in accordance with the lessening of the restraint on the reaction member, and a manually controlled brake to retard the rotation of the reaction member.

8. A speed ratio changing apparatus comprising a driving shaft, a driven shaft, means to produce a relative change of speeds containing a gear train part of which is mounted on a floating shaft, located between the driving and driven shafts, having a freely rotatable reaction member coupled between the gears of the train, the gears of said train being adapted to urge the reaction member in opposite directions and thus urge, likewise, the two ends of the floating shaft in opposite directions, and a manually controlled brake to retard the rotation of the reaction member.

9. A speed ratio changing apparatus comprising a driving shaft, a driven shaft, a gear train, adapted to produce a relative change of speeds, located between the driving and driven shafts, having a reaction member coupled to the gears of the train and adapted to be restrained, the gears of said train being adapted to urge the reaction member in opposite directions and to drive the driven shaft at an increasing velocity for a given speed of the driving shaft in accordance with the lessening of the restraint on the reaction member, and a vacuum controlled brake to retard the rotation of the reaction member.

10. A speed ratio changing apparatus comprising a driving shaft, a driven shaft, means to produce a relative change of speeds containing a gear train part of which is mounted on a ficating shaf', located between the driving and driven shafts, having a freely rotatable reaction member coupled between the gears of the train, the gears of said train being adapted to urge the reaction member in opposite directions and thus urge, likewise, the two ends of the floating shaft in opposite directions, and a vacuum controlled brake to retard the rotation of the reaction member.

11. A speed ratio changing apparatus comprising a driving shaft, a driven shaft, a gear train, adapted to produce a relative change of speeds, located between the driving and driven shafts, having a reaction member coupled to the gears of the train and adapted to be restrained, the gears of said train being adapted to urge the reaction member in opposite directions and to drive the driven shaft at an increasing velocity for a given speed of the driving shaft in accordance with the lessening of the restraint on the reaction member, and an engine-manifold vacuum-controlled brake to retard the rotation of the reaction member.

12. A speed ratio changing apparatus comprising a driving shaft, a driven shaft, means to produce a relative change of speeds containing a gear train part of which is mounted on a floating shaft, located between the driving and driven shafts, having a freely rotatable reaction member coupled between the gears of the train, the gears of said train being adapted to urge the reaction member in opposite directions and thus urge, likewise, the two ends of the floating shaft in opposite directions, and an engine-manifold vacuum-controlled brake to retard the rotation of the reaction member.

13. A speed ratio changing apparatus comprising a driving shaft, a driven shaft, a gear train, adapted to produce a relative change of speeds, located between the driving and driven shafts, having a reaction member coupled to the gears of the train and adapted to be restrained, the gears of said train being adapted to urge the reaction member in opposite directions simultaneously and to drive the driven shaft at an increasing velocity for a given speed of the driving shaft in accordance with the lessening of the restraint on the reaction member, and means to regulate the speed of the rotation of the reaction member.

14. A speed ratio changing apparatus comprising a driving shaft, a driven shaft, means to produce a relative change of speeds containing a gear train part of which is mounted on a floating shaft, located between the driving and driven shafts, having a freely rotatable reaction member coupled between the gears of the train, the gears of said train being adapted to urge the reaction member in opposite directions simultaneously and thus urge, likewise, the two ends of the floating shaft in opposite directions, and means to regulate the speed of the rotation of the reaction member.

15. A speed ratio changing apparatus comprising a driving shaft, a driven shaft and a gear train, adapted to produce a relative change of speeds, located between the driving and driven shafts, having a reaction member coupled to the gears of the train and adapted to be restrained, the gears of said train being adapted to urge the reaction member in opposite directions simultaneously and to drive the driven shaft at an increasing velocity for a given speed of the driving shaft in accordance with the lessening of the restraint on the reaction member and being adapted also to balance out to a small differential the forces tending to urge the reaction member in said opposite directions.

16. A speed ratio changing apparatus comprising a driving shaft, a driven shaft and a gear train, adapted to produce a relative change of speeds, located between the driving and driven shafts, having a reaction member coupled to the gears of the train and adapted to be restrained, the gears of said train being adapted to urge the reaction member in opposite directions simultaneously and to drive the driven shaft at an increasing velocity for a given speed of the driving shaft in accordance with the lessening of the restraint on the reaction member and having a gear adapted also to balance out to a small differential the forces tending to urge the reaction member in the said opposite directions.

17. A speed ratio changing apparatus comprising a driving shaft, a driven shaft and a gear train, adapted to produce a relative change of speeds, located between the driving and driven shafts, having a reaction member coupled to the gears of the train and adapted to be restrained, the gears of said train being adapted to urge the reaction member in opposite directions simultaneously and to drive the driven shaft at an increasing velocity for a given speed of the driving shaft in accordance with the lessening of the restraint on the reaction member and having a gear mounted on the driven shaft adapted also to balance out to a small differential the forces tending to urge the reaction member in the said opposite directions.

18. A speed ratio changing apparatus comprising a driving shaft, a driven shaft and a gear train, adapted to produce a relative change of speeds, located between the driving and driven shafts, having a reaction member coupled between the gears of the train, the gears of said train being adapted to urge the reaction member in opposite directions, the reaction member being in the form of a casing journaled on the driving and driven shafts and the gear train comprising a carrier member having a floating shaft carrying gears of said gear train and said driving shaft having a sun gear meshing with one of the gears on the floating shaft.

19. A speed ratio changing apparatus comprising a driving shaft, a driven shaft, a power transmitting train adapted to produce a relative change of speeds, located between the driving and driven shafts, and a restrainable reaction member adapted to be urged by the driving and driven shafts in opposite directions and to drive the driven shaft at an increasing velocity for a given speed of the driving shaft in accordance with the lessening of the restraint on the reaction member.

20. A speed ratio changing apparatus comprising a driving shaft, a driven shaft, a power transmitting train adapted to produce a relative change of speeds, located between the driving and driven shafts, a restrainable reaction member adapted to be urged by the driving and driven shafts in opposite directions and to drive the driven shaft at an increasing velocity for a given speed of the driving shaft in accordance with the lessening of the restraint on the reaction member, and means to substantially balance the tendency of the reaction member to be moved in said opposite directions.

21. A speed ratio changing apparatus comprising a driving member, a driven member, and a power transmission train for transmitting motion from the driving to the driven member, having a restrainable reaction member therein adapted to drive the driven member at an increasing speed in accordance with the lessening of said restraint, the elements of said train being adapted to exert forces urging the reaction member in opposite directions, which forces are balanced out except a small differential exerted in the direction towards the speed up of the driven member.

EDWARD A. ROCKWELL.